US008984086B2

(12) United States Patent
Krueger

(10) Patent No.: US 8,984,086 B2
(45) Date of Patent: Mar. 17, 2015

(54) SPREADSHEET TO WEBPAGE CONVERSION SYSTEM AND METHOD

(75) Inventor: Kevin D. Krueger, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1957 days.

(21) Appl. No.: 11/863,451

(22) Filed: Sep. 28, 2007

(65) Prior Publication Data

US 2009/0089394 A1 Apr. 2, 2009

(51) Int. Cl.
G06F 15/16 (2006.01)

(52) U.S. Cl.
CPC .................... G06F 15/16 (2013.01)
USPC ............ 709/217; 709/201; 709/203; 709/219

(58) Field of Classification Search
USPC .......... 709/216, 219, 201, 203, 217; 715/503, 715/505, 513, 523
See application file for complete search history.

(56) References Cited

U.S. PATENT DOCUMENTS

| 2003/0163519 | A1* | 8/2003 | Kegel et al. ............... 709/203 |
| 2004/0098360 | A1* | 5/2004 | Witwer et al. ................ 707/1 |
| 2004/0098451 | A1* | 5/2004 | Mayo ....................... 709/203 |
| 2004/0119727 | A1* | 6/2004 | Dietz et al. ................ 345/629 |
| 2004/0254881 | A1* | 12/2004 | Kumar et al. ................ 705/40 |
| 2005/0198567 | A1* | 9/2005 | Vermeulen et al. .......... 715/513 |
| 2006/0041834 | A1* | 2/2006 | Chen et al. ................ 715/509 |
| 2006/0041835 | A1* | 2/2006 | Chen et al. ................ 715/509 |
| 2006/0095855 | A1* | 5/2006 | Britt et al. ................. 715/760 |
| 2006/0156221 | A1* | 7/2006 | Chen et al. ................ 715/509 |
| 2006/0161844 | A1* | 7/2006 | Simkhay et al. ............ 715/538 |
| 2007/0162840 | A1* | 7/2007 | Rochelle et al. ............ 715/505 |

* cited by examiner

Primary Examiner — Philip Chea
Assistant Examiner — Mohammed Ahmed
(74) Attorney, Agent, or Firm — Fletcher Yoder, P.C.

(57) ABSTRACT

A spreadsheet to web page conversion system and method is disclosed for remotely programming and configuring control and monitoring devices. The approach is based on receiving a web page from a monitoring device via a configuration computer. The web page includes data that is arranged in rows and columns, with each row corresponding to an object and each cell in each row corresponding to a property of the object. The computer is configured to receive a user selection of data in the web page. The selected data may then be enumerated by the monitoring device and sent to the computer. The computer may receive the enumerated properties of the objects and copy them from the web page to a temporary memory space on the computer. The computer may then paste the copied data from the temporary memory space into a spreadsheet application running on the computer for revision.

22 Claims, 6 Drawing Sheets

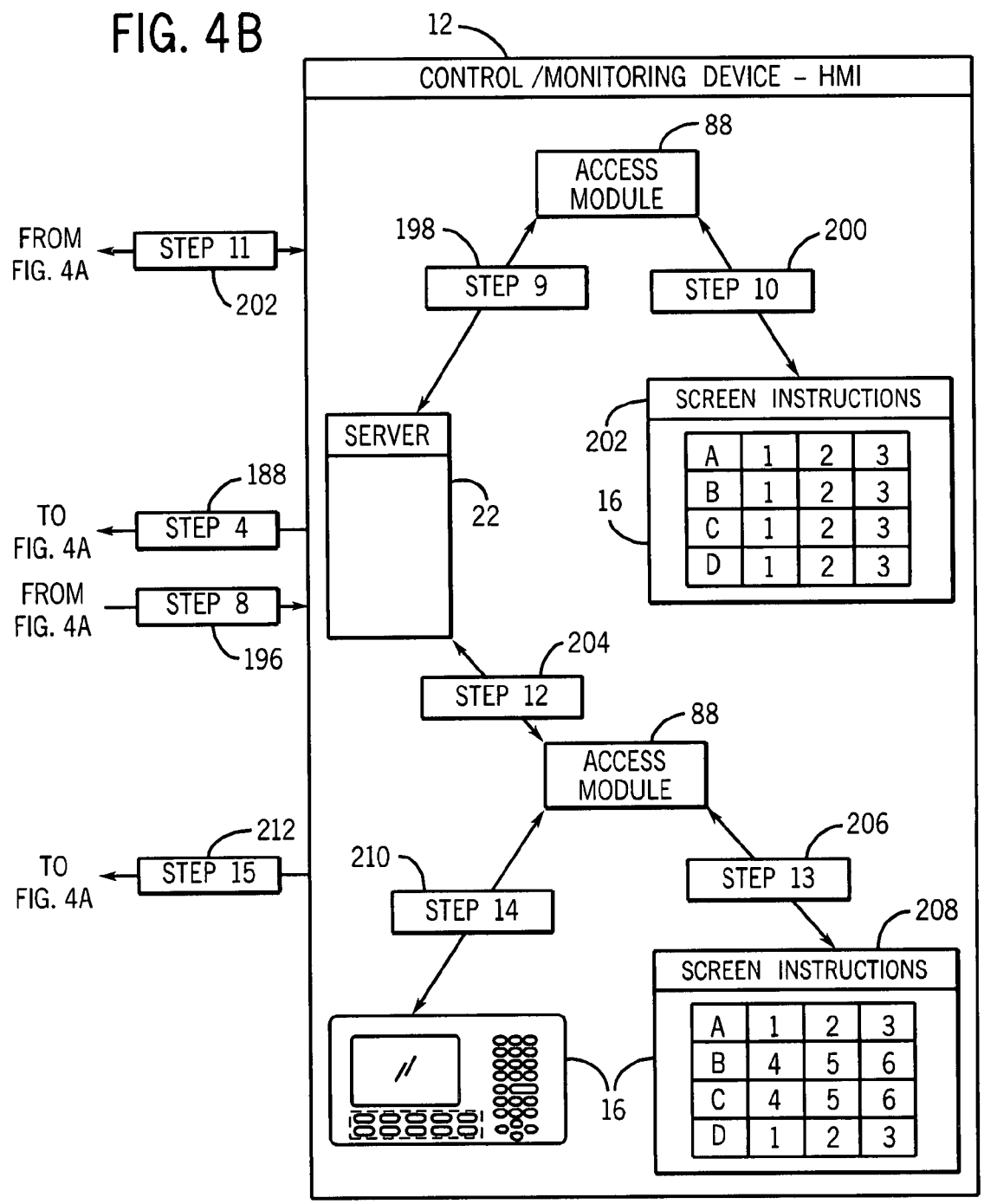

SPREADSHEET TO WEBPAGE CONVERSION SYSTEM AND METHOD

BACKGROUND

The present invention relates generally to the field of interface devices and to their configuration and programming. More particularly, the present invention relates to techniques for copying, pasting, and editing properties of enumerated objects between a web page and a spreadsheet application.

A wide range of interface devices are known and are presently in use in many different fields. In industrial automation, for example, human machine interfaces or "HMIs" are commonly employed for monitoring or controlling various processes. The HMIs may read from or write to specific registers such that they can reflect the operating state of various machines, sensors, processes, and so forth. The interfaces can also write to registers and memories such that they can, to some extent, control the functions of the process. In monitoring functions alone, little or no actual control is executed. In many other settings similar devices are employed, such as in automobiles, aircraft, commercial settings, and a host of other applications. In many applications, the interface may not communicate with a remote device or process, but may be operated in a stand-alone manner.

In many systems for configuring interface devices, relatively complex design tools and software are needed to configuring the various interface screens. The code defining the screens is then compiled and downloaded to the interface device, and thereafter may only be changed by reconfiguring the code, typically separately from the device itself, and replacing the compiled code in the device. There is generally little or no possibility for configuring or reconfiguring the interface device without perturbing or completely interrupting its normal operation (i.e., in "run-time").

There is a need, therefore, for a more flexible approach to the configuration of interface devices. In particular, there is a need for a system or method that permits a user to enumerate and edit objects of the device. It would be particularly advantageous if the objects and their related properties were included in a web page enabling the user to remotely select the desired objects. Further, it would advantageous if the selected objects could be imported into a spreadsheet application, altered, and then imported back into the web page with the revised properties.

BRIEF DESCRIPTION

The present invention provides a novel approach to interface device configuration designed to respond to such needs. The approach is based on receiving a web page from a control or monitoring device via a configuration computer. The web page may include data that is arranged in rows and columns, with each row corresponding to an object in the device, and each cell in each row corresponding to a property of the respective object. The configuration computer may be configured to receive a user selection of data in the web page. The selected data may then be enumerated by the control or monitoring device and sent to the configuration computer. The configuration computer may receive the enumerated properties of objects and copy the properties from the web page to a temporary memory space on the configuration computer. The configuration computer may then paste the copied data from the temporary memory space into a spreadsheet application running on the configuration computer. Further, the configuration computer may parse the copied data by reference to delimiters inserted by executable code (e.g., script) prior to importing the selected data into the spreadsheet application. The parsed data allows for each property of the device object is placed in a separate cell. Each property of the device object may be altered or revised in the spreadsheet by editing the values or text of each respective cell.

The revised properties may then be exported from the spreadsheet to an interface device, and further used to update the objects of an interface device and related web page. The configuration computer may be configured to place the altered data on a temporary memory space. The data may then be transmitted from the temporary memory space to the interface device. The data being separated by delimiters to ensure each property is imported into separate containers on the interface device. Finally, properties of the device objects may then be altered based upon the imported data. The updated properties may then be displayed via a web page. Methods, apparatus and computer programs are all supported for performing these and other functions of the invention.

DRAWINGS

These and other features, aspects, and advantages of the present invention will become better understood when the following detailed description is read with reference to the accompanying drawings in which like characters represent like parts throughout the drawings, wherein.

Figure 3A:
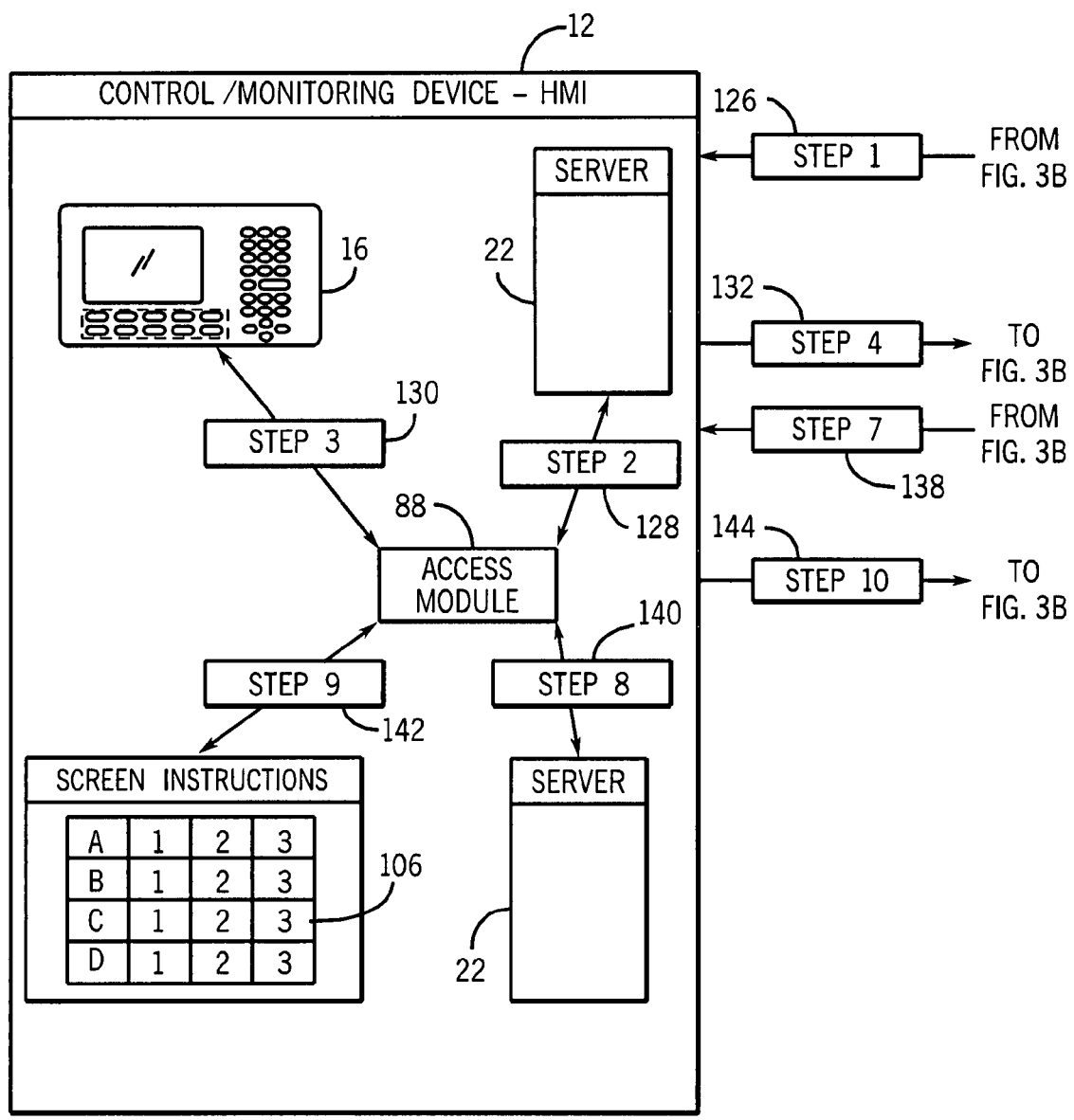
Figure 3B:
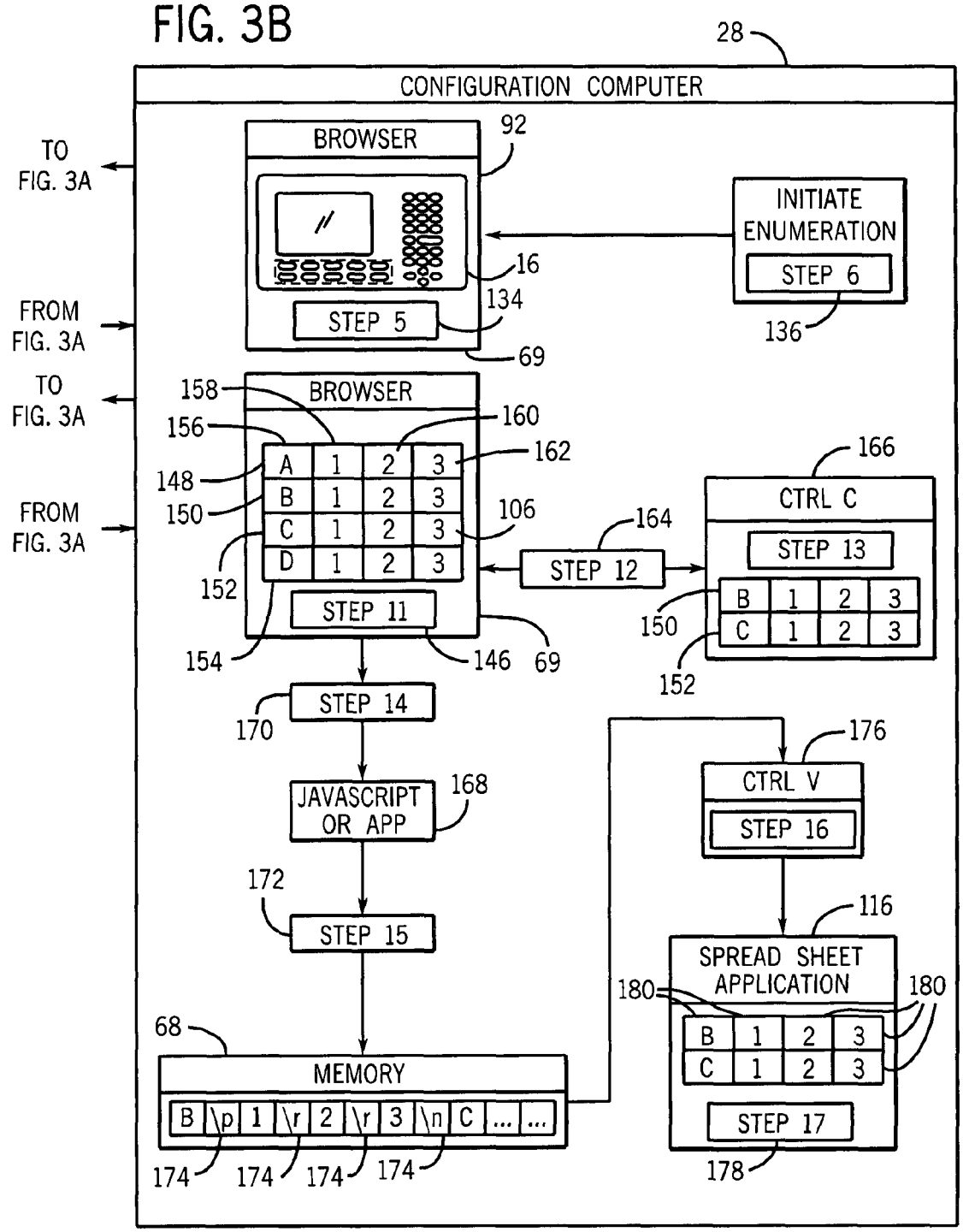
Figure 4A:
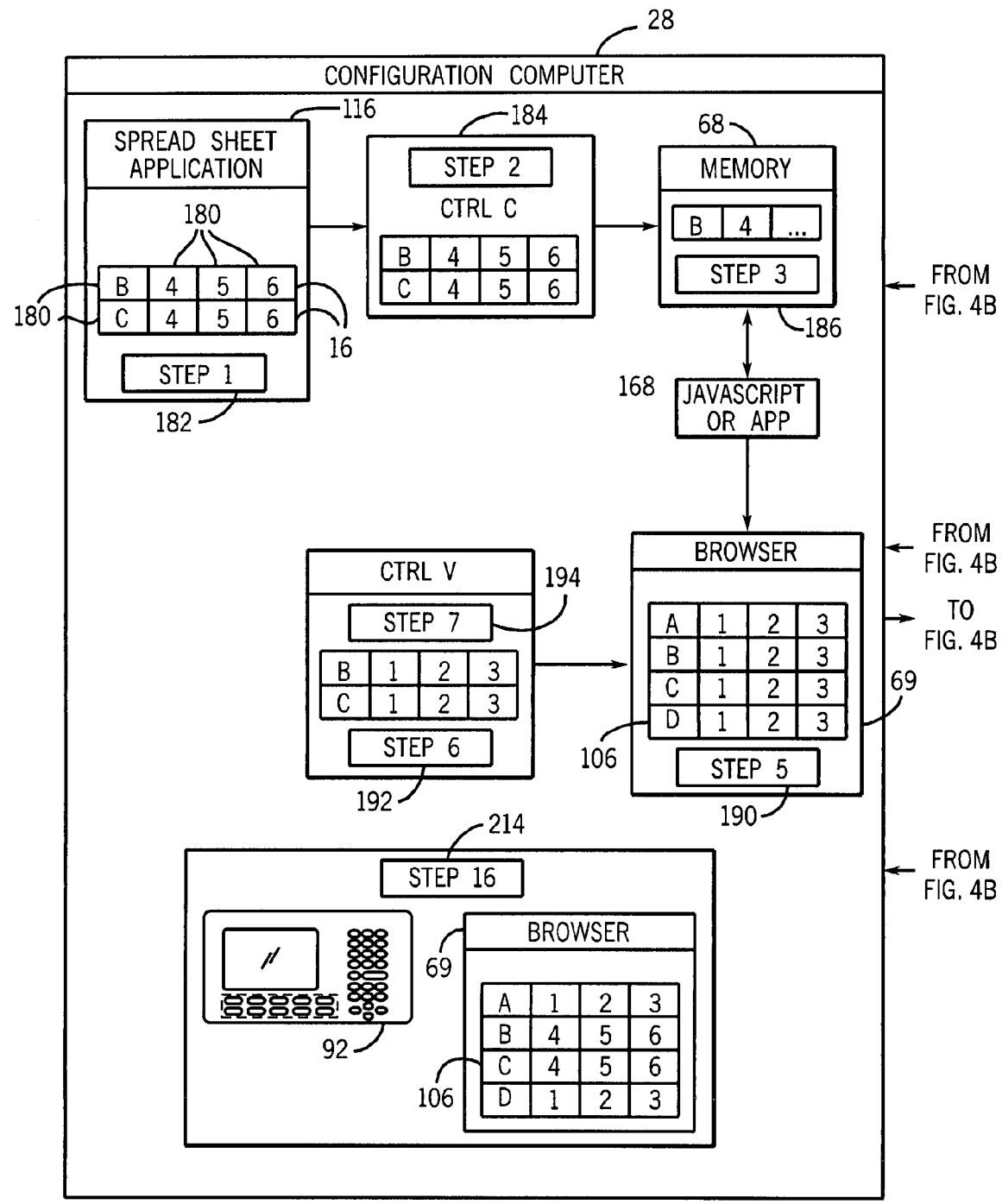

FIGS. 3A and 3B are sequence diagrams illustrating steps in interacting with a monitoring device via a configuration computer to configure or reconfigure device objects or properties of such objects in accordance with aspects of the present technique; and FIGS. 4A and 4B are sequence diagrams illustrating steps in updating device objects or properties of such object located on the monitoring device via a spreadsheet application in accordance with aspects of the present technique.

DETAILED DESCRIPTION

The present invention relates to techniques for copying, pasting, and editing properties of enumerated objects between a web page and spreadsheet application. Embodiments of the present invention relate generally to the field of configurable interfaces. In the present context, a "configurable interface" is any human interface device having embedded and dedicated code for accessing settings and displaying user-viewable views or screens based upon such settings. For example, such configurable interfaces may be used as operator interfaces for industrial equipment. More particularly, embodiments of the present invention relate to techniques for operation of configurable interfaces, and for accessing, configuring, and creating applications for utilization with such configurable interfaces by serving configuration screens to a browser or similar general purpose viewer.

An interface generally may read data from and write to remote memory and particular registers, such as for interfacing with a process or machine. In other contexts, the interface simply accesses and displays data in a stand-alone architecture. For example, the innovations described below may be implemented in industrial computer terminals, equipment interfaces (e.g., programmable logic controllers and software interfaces), and related devices such as those used in industrial and commercial settings. When used to interface with a controller, machine or process, the interfaces are sometimes referred to as human-machine interfaces (HMIs), man-machine interfaces (MMI), graphical user interfaces (GUI), user interfaces (UI), operator interfaces (OI), and so forth. The term HMI is generally used in the present discussion. However, as described below, the inventive concepts presented herein are not limited to interfaces linked to external components and systems.

Figure 1:
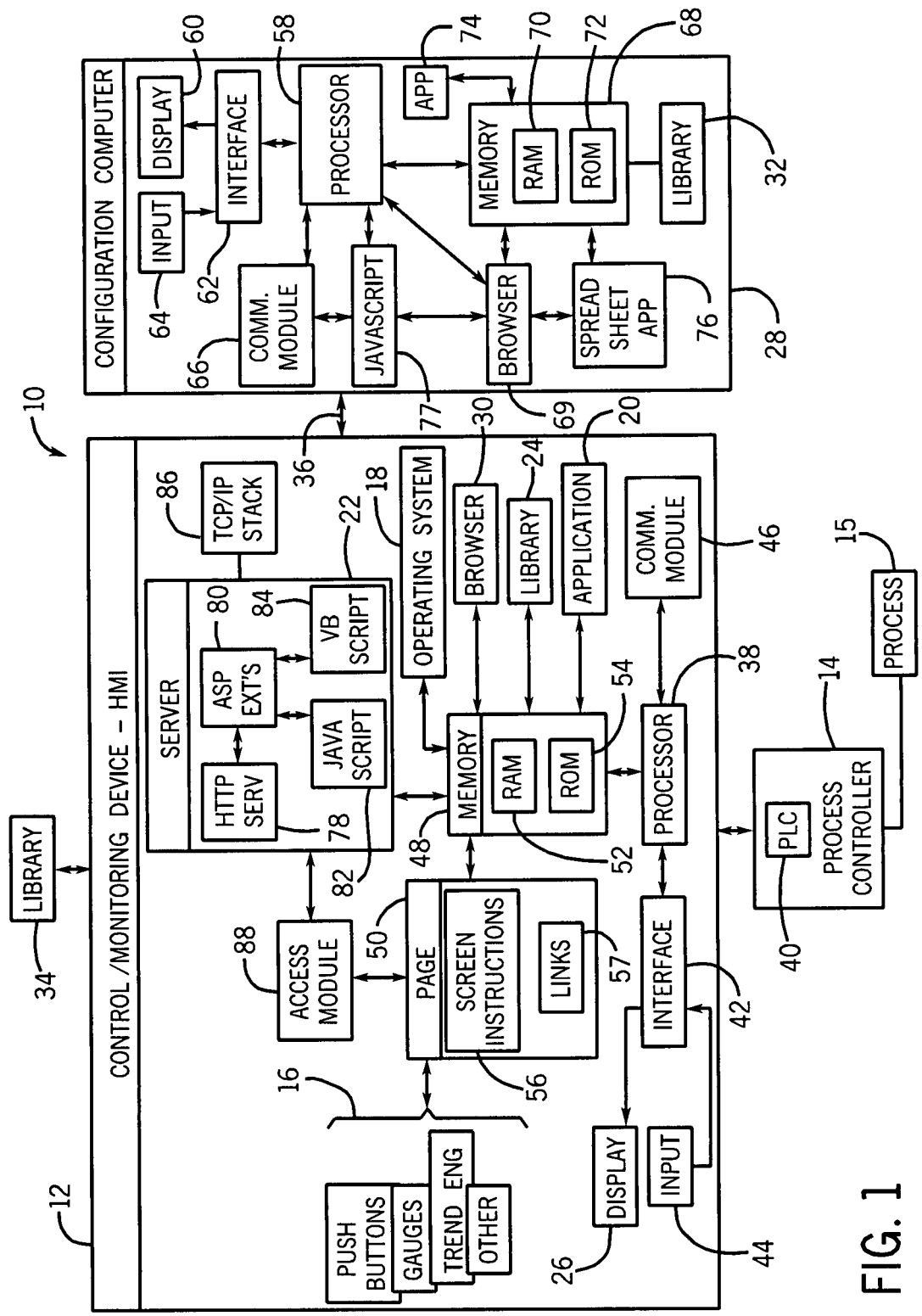
FIG. 1 is a diagrammatical overview of an exemplary monitoring device and configuration computer in accordance with embodiments of the invention, illustrating certain functional hardware and software components that may be used for monitoring or controlling a process.

Turning now to the drawings and referring first to FIG. 1, a diagrammatical representation of an exemplary control and monitoring system, such as for industrial automation, is illustrated and designated generally by reference numeral 10. System 10 includes a control/monitoring device or HMI 12 adapted to interface with networked components and configuration equipment. The figure illustrates an embodiment where HMI 12 is adapted to collaborate with a process controller 14 (e.g., a remote computer, programmable logic controller (PLC) or other controller) that may be used to operate process 15. Embodiments of HMI 12 may be adapted to allow a user to interact with virtually any process. For example, the process may comprise a compressor station, an oil refinery, a batch operation for making food items, a mechanized assembly line, and so forth. Accordingly, process 15 may comprise a variety of operational components, such as electric motors, valves, actuators, sensors, or a myriad of manufacturing, processing, material handling and other applications. Further, process 15 may comprise control and monitoring equipment for regulating process variables through automation and/or observation. Likewise, HMI 12 may physically resemble existing hardware, such as a panel, monitor or stand-alone device.

As described below, HMI 12 includes a stored application that dictates the layout and interaction of a number of device elements or objects 16. Because device objects 16 are basic to certain of the inventive concepts, a few words of introduction are in order. Device objects 16 generally include four features: properties, methods, connections (or connection points) and communications interfaces. Properties are attributes that can be adjusted, such as to define an image or representation of the element in a screen view, as well as its location on the screen, and so forth. A method is an executable function (sometimes referred to herein as the objects 16 "functionality" or "state engine"), and defines an operation performed by execution of the element. A connection is a link between objects 16, and can be used to cause data (read from a memory or written to a memory) to be sent to another element.

Specific examples of device objects may include software pushbuttons, timers, gauges, PLC communication servers, screens, and applications. In general, virtually any identifiable function may be configured as such an object. Moreover, as discussed below, such objects may communicate with one another to perform a wide range of display, monitoring operations, and control functions. Also, while objects associated with an image are quite useful, particularly for screen views, many objects may not have a visual representation, but may perform functions within an HMI, such as calculations, or even management and data exchange between other objects.

Design and reconfiguration of the object may be done via a remote configuration computer by serving the device objects, or properties thereof, to a configuration computer from the HMI. For example, an HMI coupled to a laptop via a network may provide a user with configuration capabilities by serving up the objects and properties in a tabular form. In embodiments of the present invention, serving up the objects and properties may include a combination of Dynamic Hypertext Markup Language (DHTML) and an Active Server Page (ASP) to serve dynamic contents to a browser. An ASP script is specially written code that includes one or more scripts (i.e., small embedded programs) that are processed on a server (e.g., Web server) before the page is sent to a user. Typically, in conventional usage, such script prompts a server to access data from a database and to make a change in the database. Next, the script typically builds or customizes the page before sending it to the requestor. As discussed below, such scripting is used in the present framework quite differently, such as to build screen views without prior knowledge of either the functionality of device objects 16, or their interrelationships.

HMI 12 may also include server software that permits viewing of the device objects, and their associated appearance and functionality, without the need for special viewing or configuration software. This benefit flows from the fact that the device objects are resident in the HMI, and "served up" by the HMI to a browser or other general purpose viewer on the configuration computer. In other words, necessary support for external computer workstations (e.g., laptop and desktop computers) may be reduced or eliminated. It should be noted that reference to a "browser" for viewing and modifying configuration of the interfaces is not limited to Web browsers or to any particular browser. References to a browser are intended to be exemplary. More generally, the term "browser" is utilized herein to reference software which includes any general purpose viewer.

The HMI 12, through the programming of the device objects 16 as described below, may be thought of as including instructions for presenting one or more screen views, and device objects executed upon interaction with the HMI by reference to the screen views (e.g., pressing a button, touching a location of a screen, and the like). The screen views and device objects 16 may be defined by any desired software or software package. For example, the screen views and device objects 16 may be called by or executed by an operating system 18. The device objects 16, as discussed above, in accordance with present embodiments, may include objects conforming to ".NET" or "ActiveX" standards. The operating system itself may be based upon any suitable platform, such as Window CE. As referenced herein, the device objects 16 and tools support Web services or technology for transmitting data over networks (e.g., the Internet). These device objects 16 thus follow a set of rules regarding information sharing and are adapted for use with various scripting and programming languages, as described below. Such device objects 16 enable provision of interactive content to outside applications such as a LAN, WAN, an intranet, an extranet, or even the World Wide Web. Accordingly, operating system 18 and the various device objects 16 facilitate dynamic configuration of the HMI 12 through a browser by allowing configuration access (e.g., serving up) to the browser.

For example, such configuration access includes access for instantiation or enumeration of device objects 16. In other words, new device objects 16 can actually be created and implemented from the browser. Again, it should be noted that the browser does not require actual functional access. Indeed, in one embodiment, requests via the browser result in a "draw" sequence of operations based on data functionality and content of device objects 16 in a container, thus allowing illustration of the device element representations and access to their configuration without actually serving up functional aspects. This allows for configuration via a remote workstation without necessitating technical support for the remote workstation. Such aspects are described in greater detail below.

In addition to the operating system and device objects 16 as described above (and as described in greater detail below), the HMI 12 includes an application or application layer 20. The application, which may itself comprise a device element, facilitates access to and acquisition of information from the various device objects 16 of the HMI. In particular, the application 20 represents a first level in a multi-level device element that can be enumerated for execution. The application 20 in a practical implementation may comprise a user application in the form of an XML page. The user application is then interacted with by the user or operator, as well as by the designer as described in greater detail below.

The screen views and device objects 16 may be described as independent executable pieces of software. In a present implementation, the screen views are defined by appropriate code written in a markup language (e.g., Hypertext Markup Language or HTML). Thus, the configuration of graphical interface screens for the HMI 12 may be performed without the use of conversion programs. Further, by programming of the device objects 16, the screen views may be developed directly on the HMI 12 via resident server software (designated as server 22) that makes the resident development environment available for remote access. Specifically, in one embodiment, representations of certain device objects 16 (e.g., ActiveX controls) are served up to the browser without serving up the software components themselves. Because a development or design-time environment may be accessed via a browser, the need to download changes to the screens and to update remote configuration software applications may be eliminated.

A library 24 of available device objects 16 may reside on the HMI 12 to facilitate configuration of the HMI 12, as described below. The screen instructions may call upon the device objects 16 for performing desired functions based upon user inputs, and these instructions may be programmed into versions of the pre-programmed objects 16. For example, the user may provide initiating inputs by touching a location on a touch screen or depressing keys on a keyboard. Based upon the screen instructions and the device objects 16 associated with the instructions (e.g., with specific locations triggering calls or execution of pre-configured device objects 16) the desired functions may then be executed. Accordingly, the user is enabled to interact with a process, typically to change screen views, write to registers, or command the generation of other output or control signals. In a stand-alone implementation, the interactions may simply recall or store data, change screens, and so forth.

The HMI 12 may be configured by interacting directly with a panel or display 26 on the HMI itself (if one is present), but in many cases configuration will be performed from a remote configuration computer 28. For example, access is provided directly to the resident library 24 and/or operating system 18 and application 20 via a browser or similar application. In a present implementation, no other specialized software is required at the configuration computer or station 28. Indeed, the server 22 resident on the HMI 12 may provide access to the device objects 16 in library 24. By storing the device objects 16 in library 24 directly on the HMI 12, the risk of version conflicts and so forth are eliminated or reduced. Additionally, the HMI may be directly connected to the configuration computer, or accessed by reference to an IP (Internet Protocol) address assigned to HMI 12.

Access control schemes may be used to limit the ability to change screens and device objects 16. For example, a password or user access status may be required to gain such access. Further, in a presently contemplated embodiment, configuration computer 28 automatically recognizes the HMI or the terminal on which the HMI is resident as a device upon being coupled to the configuration computer (e.g., similar to an external memory or drive). Thus, once connected to the configuration computer, the HMI may simply be "recognized" as a device that can be accessed (providing the configuration screen and tools described below).

Once the device objects 16, resident on the HMI 12, are accessible to the configuration computer 28, aspects of the HMI 12 can be modified or updated directly on the HMI 12 via the communication link from the configuration computer 28. For example, a user may wish to update a particular HMI graphic to provide data, such as historical data or trending relating to information being received from a newly installed sensor for process 15. Additionally, the user may find it desirable or convenient to update the HMI graphic for presentation of such data while in an off-line mode (e.g., without immediately implementing the changes). In such a scenario, the user may link to the library 24 of available device objects 16 via the configuration computer 28 and use them to modify the HMI graphic or functionality in a development environment, such as a spreadsheet application located on the configuration computer 28.

It should be noted that additional device objects 16 can be added to the library 24. For example, if a trending device element is not resident on the HMI 12, a user can download such an element to the HMI 12 from a configuration library 32 resident on the configuration computer 28. Alternatively, a user could access the trending device element from a resource library 34 accessible via a network (e.g., the Internet), either directly to HMI 12 or through configuration computer 28. This may be particularly beneficial because new and improved device objects 16 can be downloaded to the HMI 12 individually and on a periodic basis, thus adding new functionality without necessitating the periodic release of new conversion programs or HMI operating systems. Further, in embodiments using embedded code (e.g., operating system, server software, device objects, etc.), because the embedded code resides on the HMI 12, version conflicts with the embedded code may be avoided and the necessity for configuration computer software upgrades may be eliminated.

As discussed, FIG. 1 illustrates HMI 12 coupled to a general purpose computer (PC) or configuration computer 28 via data or content link 36. The data link 36 may comprise a direct cable link, a network link, a wireless link, or any interconnecting circuit between locations for the purpose of transmitting and receiving data. For example, the data link 36 may represent, in part, the Internet. Further, both the HMI 12 and configuration computer 28 are illustrated as comprising certain exemplary components that facilitate operation and communication in accordance with embodiments of the present techniques.

The HMI 12 may comprise a configurable tool built around an HMI microprocessor 38, and may be adapted to interface with an industrial hardware interface such as a programmable logic controller (PLC) 40. While HMI 12 may comprise many different parts and components, certain exemplary components are presently illustrated to demonstrate aspects in accordance with embodiments of the present techniques. Specifically, in addition to processor 38, the illustrated embodiment includes a display module 26 (e.g., a graphical component or physical display screen), a display/input interface module 42, an input module 44 (e.g., keypad or touch-screen), a communication module 46 (e.g., TCP/IP component), and memory 48. In accordance with the present techniques, the memory module 48 may store computer programs and components such as a markup language page 50 (e.g., HTML page), control object library 24, and embedded code defining a configuration application 20. Memory module 48 may include temporary memory space 52 (e.g., RAM, FLASH, DRAM) and permanent memory space 54 (e.g., ROM, PROM, EPROM, EEPROM) or any other volatile or non-volatile memory.

The markup language page 50 may include any document created in a markup language that can be displayed. Multiple pages may be stored in memory 48 for utilization in interfacing with a system or process 15. As discussed above, each page will typically comprise screen instructions 56 and links 57 to pre-programmed functional modules or device objects 16. For example, links 57 may cooperate with certain device objects 16 to facilitate display of system parameters and/or control of a related system or process. The HMI 12 may provide access to such pages and configuration of such pages using a server program 22 (e.g., an ASP server) stored in memory 48. Additionally, the HMI 12 may utilize such pages by employing a standard browser program 30. In accordance with embodiments of the present techniques, software components related to page 50 facilitate a configurable development environment. In one embodiment, the development environment itself is configurable. Accordingly, as described below, fixed components of the development environment (e.g., a banner) can be changed for aesthetic or functional purposes. For example, a customer purchasing an HMI in accordance with embodiments of the present technique can change a banner in the development environment to display a customer logo rather than a manufacturer logo. A user can make changes to the development environment in the same way changes are made to object properties.

The device objects 16 may comprise modular control strategies and graphical components that enable system configuration and operation. For example, device objects 16 may include modules for configuring one or more field devices (e.g., inputs and outputs) and related control logic (e.g., expressions). Indeed, these device objects 16 may be adapted to provide reusable configurations for process equipment, sensors, actuators, control loops and so forth. As discussed above, in accordance with embodiments of the present techniques, available device objects may reside in a library 24 stored on the memory module 48. Each device element 16 in accordance with present techniques may include a unique control tag, a data history, a display definition, and a control strategy (i.e. stat engine). Further, each device objects 16 may be a separate module, enabling operation, debugging, and transfer of individual objects 16 without affecting other objects. In many settings, and particularly in industrial automation contexts, "families" of such objects may be pre-defined, such as for various types of push buttons, trending modules, and so forth.

As discussed above, application 20 may cooperate with separate server application 22 that is stored on the HMI to provide access to configuration of the HMI 12. Alternatively, application 20 may itself comprise a server module to perform such a function. In either embodiment, a user may remotely configure the HMI 12 from configuration computer 28 using a browser 30 as discussed in more detail below. Application 20 may comprise the configured device objects that configure the markup language page 50. For example, application 20 may enable a user to configure page 50 in a development environment for use as a graphical interface in the HMI 12. Once configured, page 50 may be saved as a file, and implemented in an operation mode of the HMI 12, where page 50 may be utilized as an operable graphical interface. Once again, each device element 16 may be an independent executable piece of software that can communicate with other objects to perform complex functions.

The configuration computer or PC 28, much like the HMI 12, may comprise a general purpose tool built around a processor 58. The illustrated PC 28 is adapted for interface with the HMI 12 through data link 36 that facilitates configuration of the HMI 12. While the PC 28 may comprise many different parts and components, certain exemplary components are presently illustrated to demonstrate aspects in accordance with embodiments of the present techniques. Specifically, in addition to processor 58, the illustrated embodiment includes a display module 60 (e.g., a graphical component or physical display screen), a display/input interface module 62, an input module 64 (e.g., keyboard), a communication module 66 (e.g., TCP/IP component), and a memory 68. In accordance with the present techniques, the memory module 68 may store computer programs and components such as the browser application 69. In certain embodiments, the browser application 69 may be adapted to display a markup language page, such as page 50. Similar to memory 48 in the HMI 12, memory 68 may include temporary memory space 70 (e.g., RAM, FLASH, DRAM) and permanent memory space 72 (e.g., ROM, PROM, EPROM, EEPROM) or any other volatile or non-volatile memory. Finally, memory 68 may include a variety of other applications 74 and be configured to execute a spreadsheet application 76 or java script 77 in an associated with a web page.

FIG. 1 further illustrates other functional components contained in embodiments of HMI 12 built upon the overall structures described above. In particular, the figure illustrates server software 22 that permits dynamic content to be provided to a browser 69 that will be displayed in configuration computer 28. The server software 22 also facilitates interaction with the various device objects 16 configured within and stored within the HMI 12. Moreover, within the HMI is software, which facilitates interaction with display hardware 26 of the HMI itself, storage hardware or memory 48 of the HMI, communications hardware 46 of the HMI, input hardware 44 of the HMI, and generally with system components 40 which will be remote from but interconnected with the HMI.

The server software 22 may generally includes an HTTP server component 78, an ASP extensions component 80, a Java script component 82 and a VB script component 84. As will be appreciated by those skilled in the art, in a present implementation, the HTML server service component 78 receives and transmits data by means of a TCP/IP stack 86 which is exchanged with the browser application 69 contained within the configuration computer 28. The HTTP server module 78 may pre-process portions of code received via the TCP/IP stack 86 based upon code extensions in the form of "ASP" extensions. While various other alternative scripting may be employed, certain embodiments use ASP extensions to convey to module 80 that scripting functions are to be performed. The ASP extensions module 80, then, handles the ASP content as described below. Various alternatives to such ASP scripting might include Java service pages (.JSP scripting), CGI scripting, API scripting, and so forth. The Java script module 82 and the VB script module 84 are provided as examples of interpreters for the server side scripting.

As will be appreciated by those skilled in the art, various existing approaches have been used for scripting, including using ASP extensions. Such applications typically involve modifications to a database. That is, in order processing software and applications, such extensions may be used to alter order status, inventory levels, and so forth. In the present application, such extensions are used, and more generally such server side scripting is used entirely differently. Here the scripting is used to access device objects, enumerate such objects to determine their identifies and properties, compile views that can be provided to the designer, and perform all such functions without prior knowledge of the application or device objects themselves, and also without serving the actual code or device objects themselves. The server software 22 thus provides a highly flexible platform, particularly in conjunction with the access module 88 described below, that can be used with any underlying configuration or device objects to provide a simple and user-friendly design-time environment served to a general purpose browser.

Access module 88 is itself a device element. This module runs in the web services processing space. In general, access module 88 is called by the server module 22 to process code flagged by ASP extensions. Access module 88, then, accesses various device objects which are configured within the HMI as described more fully below. As illustrated in FIG. 1, such device objects may include push buttons, gauges, trend engines, and so forth. In a more general context, such device objects may include any graphical elements used for interacting with an HMI or any other display that may or may not communicate with a process. As described above, such device objects 16 may include elements only of the display which is a stand-alone device. In certain environments, for example, the HMI may be a communications device, such as a cell phone, a location device, such as a GPS receiver, or any other human interface device. It should also be noted that the device objects 16 need not all have a viewable content component. That is, many device objects may be configured that are not represented in either the browser of the design-time environment or the viewable screen of the HMI itself. Such device objects may perform computations, control functions, locating functions, in various processing that is simply not viewed by the user.

Figure 2:
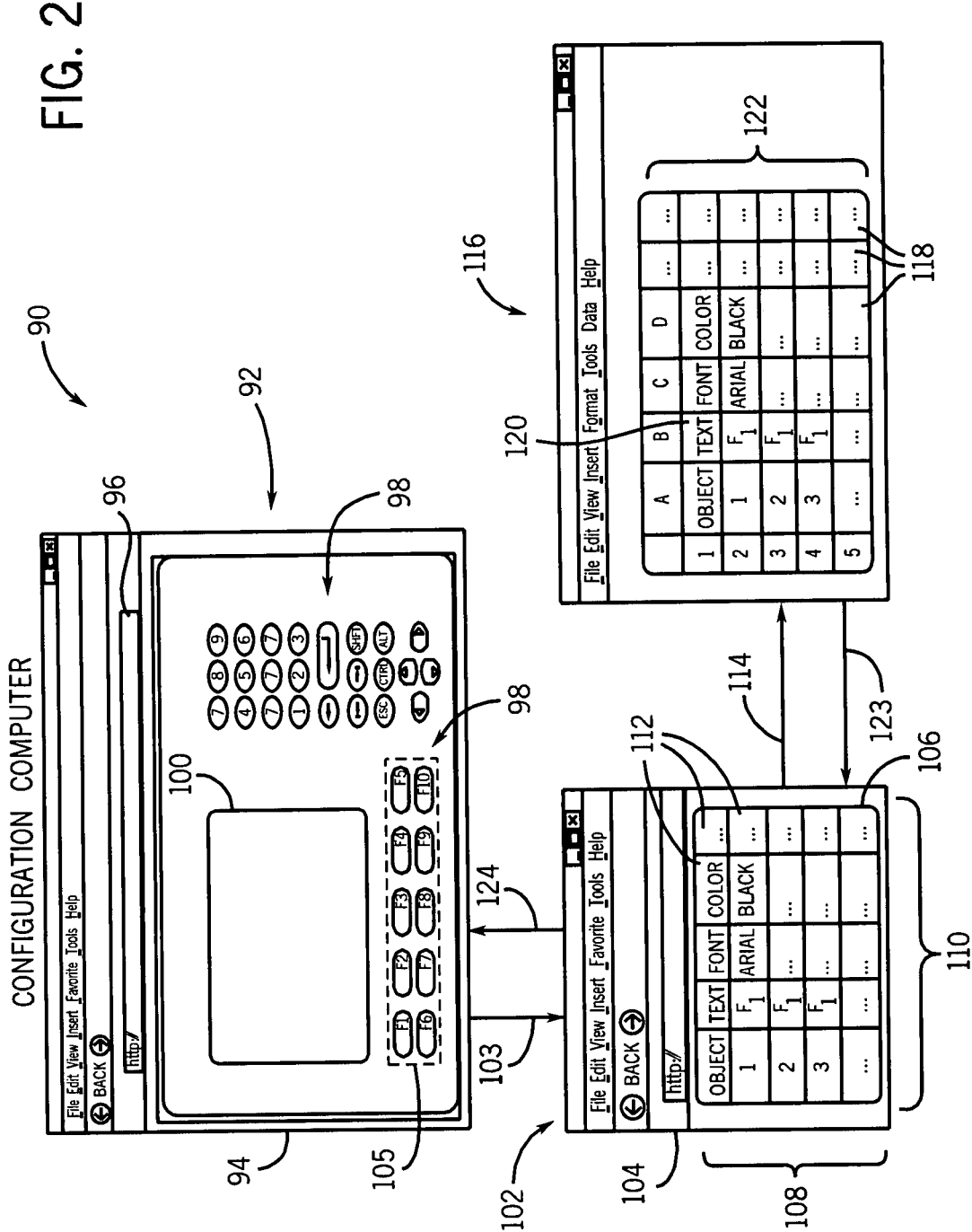
FIG. 2 is a general overview of certain views or containers that may be displayed and interfaced on a configuration computer that is in communications with a monitoring device.

FIG. 2 is a general overview of exemplary configuration screens that may be displayed in development environment 90 in accordance with embodiments of the present technique. The figure illustrates that the development environment 90 may include a web browser and spreadsheet application located on a configuration computer 28. Specifically, a development screen 92 is illustrated that may be viewed via browser 94 located on configuration computer 28. This development screen 92 may be accessed much like any other web page, from a computer that is linked (e.g., via the Internet) to an HMI. For example, a user having appropriate access status may simply type an address into an address window 96 of the browser 94 and gain access to configuration of the HMI via the development view 92.

It should be noted that the illustrated embodiment of the development environment 90 includes development screen 92 that is representative of a physical HMI panel, including buttons 98 and a work screen 100. Indeed, to facilitate operational familiarity, the development environment may include graphics and software functions that emulate configuration directly on the physical HMI. For example, a user may be able to virtually push the buttons 98 and manipulate the work screen 100 in a fashion similar to configuring the HMI directly. Accordingly, a user that is accustomed to programming an HMI directly on the HMI in the field, may immediately be familiar with the development environment 90 because the appearance and functionality mimic an actual HMI.

In addition to the representation of the actual HMI, the development environment 90 may comprise an enumeration tool 102 that enables a user to enumerate, generally represented by reference numeral 103, properties of selected device objects 16 (e.g., buttons 98, work screen 100) to a web browser 104. For example, the properties for of a group of function keys or virtual buttons 105 may be displayed in a tabular form 106 and viewed via web browser 104. Table 106 may include a matrix or array of rows 108 and columns 110 with each row representing a device object 16 and each column represent a property of the device object 16. The figure illustrates a few exemplary properties that may be displayed for function keys 105. For example, the properties that may be displayed may include a tag, a register, a physical address, operational logic, font, color, and so forth. In other words, table 106 may include a plurality of individual cells 112 that represent individual properties of each respective device object 16. Again, device objects 16 may include push buttons 98, alarms, trending, graphics, macros, banners and so forth of an HMI screen. Moreover, development environment 90 enables the user to enumerate a single device object 16 or multiple device objects 16 for display via browser 104. For example, a user could enumerate all of the device objects 16 located on an HMI 12, even the ones not displayed to the user. This is advantageous for certain embodiments of the present invention because it provides the user with a tool that may be used to quickly revise multiple device objects 16.

With the properties in tabular form 106 and displayed on browser 104, a user may select specific device objects and/or properties of the device objects to be exported, generally represented by reference numeral 114, to a spreadsheet application 116. The user may initiate the exportation process by selecting rows and columns and using a "copy" command (e.g., "Ctrl C"). Further, the user may import the objects and properties into the spreadsheet application by using a "paste" command (e.g., "Ctrl V"). As will be discussed, the user initiated copy and past command executes a code or script that ensures each property of each selected object will be imported into individual cells 118 of spreadsheet application 116. The orientation of the objects and properties may be the same or similar to the display of the table 106 in browser 104. Once the properties of the objects are pasted into the spreadsheet, they may be revised to represent desired change of the device objects 16 located on the HMI. Additionally, new device objects may be created by copying the properties of the imported device objects. Again, this is advantageous for certain embodiments because multiple objects and properties may be edited or added very quickly by using the functionality of the spreadsheet 116.

For example, embodiments of the present invention may enable a user to quickly and efficiently add four function keys 105 (e.g. F11, F12, F13, F14) to the configuration screen 90 by exporting the properties of one or more of the function keys to spreadsheet 116. The user could then copy the object into multiple rows 122 and change the "text" cell 120 for each of the respective copied objects (e.g., F1 to F11). In sum, this is beneficial because it does not require a user to select or input default settings for each of the newly created function keys. Instead, the user was able to capture the settings on a dynamic basis by enumerating the properties of current function key to web browser 104.

Finally, after the desired changes or additions have been made in the spreadsheet application 116, the user may import the changes, generally represented by reference numeral 123, to web browser 104. As with the export process, the user may initiate the import process via a copy and paste command to execute a code stored on the configuration computer 28. The changes or additions may then be imported, generally represented by reference numeral 124, into the HMI 12 and displayed on the development screen 90. In sum, this was a brief overview of one method and system that may be used to program HMI 12 via spreadsheet application 116 that is located on configuration computer 28. A more detailed description of the method and system follows.

FIGS. 3A, 3B, 4A and 4B are sequence diagrams illustrating steps in interacting with monitoring device or HMI 12 via a configuration computer 28. Specifically, the figures illustrate the steps that may be used to configure or reconfigure device objects 16 stored on the HMI. As discussed, embodiments of the present technique relate to abstracted display building based on modification to software components via queries. Queries are utilized in accordance with embodiments of the present invention to transfer configuration input to software components in the configurable interface from a browser application on the configuration computer.

In one embodiment, communication is facilitated between the configurable interface and the configuration computer by unique utilization of a server 22, such as an ASP (Active Server Pages) server as mentioned above. Accordingly, modifications may be made to an HMI 12 by composing new or modifying existing screen instructions, and by adding, removing, or modifying device objects 16 called or executed in response to user inputs made by reference to the displayed HMI screens. A design can manipulate graphical representations on a browser to change actual control objects on the HMI. Changes to graphical representations on the browser are submitted as a query to the HMI, which receives the query and adjusts aspects of the relevant device objects 16 accordingly. For example, a color property of a graphic feature may be altered through the browser resulting in a query that operates to instruct a relevant functional module of a device element 16 to change its color property, thus changing the color of the corresponding representation on the HMI 12 and within the browser 69 on the configuration computer 28.

FIGS. 3A and 3B illustrate one possible method for enumerating and exporting properties of device objects 16 to a spreadsheet application 116 located on the configuration computer 28. The process begins by configuration computer 28 querying server 22 to serve up device objects 16 in a format that may be displayed on browser 69 (STEP 1, reference numeral 126). For example, browser 69 initiates communication by sending an identification query to HMI 12 requesting specific identity information from the HMI 12. After receiving the query, HMI 12 processes the request and responds with identification data (e.g., "Model 200 Panel View"). To determine the identification data, server 22 may call access module 88 to identify the device objects 16 located on HMI 12 and return the properties to server 22. (STEPS 2 and 3, reference numerals 128 and 130, respectively).

The query and response procedure may be completed in one step or may include multiple steps executed until all of the requested display characteristics of the software components are enumerated. In one embodiment, the query and response procedure continues until an entire tree structure of elements resident on the HMI 12 has been enumerated. It should be noted that much or all of such enumeration may be transparent to the designer, who may be interested in one or more properties of a device element at a time. Server 22 then serves the requested information in a format (e.g., development screen 92) that may by displayed in browser 69 on configuration computer 28 (STEPS 4 and 5, reference numerals 132 and 134, respectively). Once the view is displayed, the user may then select specific device objects 16 and initiate a request for server 22 to enumerate the properties of the selected device objects 16 in a tabular form (STEPS 6 and 7, reference numerals 136 and 138, respectively).

Upon receiving request 138, server 22 may call on access module 88 to identify the properties of the selected device objects 16 and return the selected properties (STEPS 8 and 9, reference numerals 140 and 142, respectively). Server 22 may then organize the properties in a tabular form 106 for displaying on the configuration computer 28 via web browser 69. Additionally, in certain embodiments, server 22 may place all of the properties of device objects 16 in tabular form 106 after the initial query by access module 88 (i.e., after STEP 3, reference numeral 130). If this process is used, server 22 is not required to call on the access module 88 a second time to enumerate the selected properties because all of the properties were enumerated after the first inquiry. In other words, STEP 8 and 9 may not be required. Moreover, server 22 may serve all of the enumerated device objects 16 to the configuration computer 28 after the initial inquiry (i.e., after STEPS 1-3, reference numerals 126-130, respectively). In other words, embodiments of the present invention are not limited to the exact steps illustrated in FIGS. 3A and 3B. The general concept is that server 22 places some or all of the device objects 16 in a tabular form 106, or any other desirable form, and serves the data to configuration computer 28 (STEP 10, reference numeral 144).

Configuration computer 28 may then display the enumerated device objects 16 in tabular format 106 via browser 69 (STEP 11, reference numeral 146). Specifically, FIG. 3B illustrates a table having rows 148, 150, 152, and 154 that represent device objects 16 and columns 156, 158, 160, and 162 that represent properties of the respective device objects. For example, device object 150 includes properties for the second enumerated device object 16 (i.e., B, 1, 2, 3 etc.). The user may then select specific properties for each of the enumerated device object 16 (STEP 12, reference numeral 164). In the illustrated example, the user has selected rows 150 and 152 and the respective columns. The user may then export the selected property via executing a copy command (e.g., "CTRL C" STEP 13, reference numeral 166).

Upon executing the copy command, a java script or code 168 then accesses the browser source code for table 106 that is displayed in browser 69 (STEP 14, reference numeral 170). Java script 168 then locates the selected data in the source code and insets delimiters 174 based upon the table display (STEP 15, reference numeral 172). Delimiters 174 may include a number of characters or codes (e.g., "\r\n", "\n", "\r", "\t", ascii code 9, ascii code 10, ascii code 13, etc,.) that enable spreadsheet application 116 to detect rows and columns thereby enabling spreadsheet application 116 to place individual properties in individual cells 180. Additionally, java script 168 may copy the delimited data to memory 68. As discussed, memory 68 may include permanent and temporary memory space such as a clip board. Therefore, embodiments of the present invention enable java script 168 to copy a data string with delimiters to temporary memory space 70 of the configuration computer 28.

The user may then paste the selected data into spreadsheet application 116 via executing a paste command (e.g., "CTRL V", STEP 16, reference numeral 176). The selected data would then be parsed and inserted into the spreadsheet application 116, with each property being placed in individual cells 18 via the use of delimiters 174. The user may then edit the individual properties via the spreadsheet editing tools (STEP 17, reference numeral 178). In the illustrated example, two device objects 16 are displayed in the spreadsheet application with each object having four illustrated device properties. In other words, eight individual cells 180 are displayed in the spreadsheet application where each cell may be separately revised or changed. Additionally, once imported, these device objects may be copied multiple times in the spreadsheet application to create new device objects. This enables the user to quickly create default properties for a new device object 16 by copying the existing default properties of a current device object 16.

Once the properties have been changed in spreadsheet 116 the user may then update the HMI 12 with the revised or new device objects 16. FIGS. 4A and 4B illustrate one possible method for editing and importing properties of device objects 16 from spreadsheet application 116 to HMI 12. The process begins with the user opening spreadsheet application 116 to display the enumerated properties of device objects 16. The enumerated properties may be imported into the spreadsheet via the process illustrated in FIGS. 3A and 3B or the properties may be from a previously saved file. Specifically, FIG. 4A illustrates spreadsheet application 116 displaying eight properties 180 (i.e., "B", "4", "5", etc.) of two device objects 16 in a tabular form. In particular, FIG. 4A shows the device properties illustrated in FIG. 3B revised to new values as shown in FIG. 4A (STEP 1, reference numeral 182).

The user may then select the revised device objects 16, and the related properties, and initiate a copy command (e.g., "CTRL C" STEP 2, reference numeral 184). Once the user initiates the copy command, spreadsheet application 116 will delimit and copy the selected properties to memory 68 (STEP 3, reference numeral 186). With the data stored in memory 68, the user may then open browser 69 and display the enumerated properties of the HMI via a communication link with server 22 (STEPS 4 and 5, reference numerals 188 and 190, respectively). As discussed, server 22 may serve up the enumerated properties to browser 69 in tabular form 106. The user may then select the device objects and properties to be altered (STEP 6, reference numeral 192). Once the properties have been selected, the user may initiate a paste command (e.g., "CTRL V", STEP 7, reference numeral 194) to enable java script 168 to parse the delimited data from memory 68 and query server 22 (STEP 8, reference numeral 196). Using this technique, the configuration and reconfiguration of device objects on HMI 12 is dynamic in that the configuration computer 28 queries HMI 12 before updating browser 69. Specifically, the query may enable HMI 12 to determine which device objects and properties are to be updated before displaying the updated properties on browser 69.

Therefore, upon receiving the query command from configuration computer 28, server 22 can call access module 88 to identify the current device objects and properties (STEPS 9 and 10, reference numerals 198 and 200, respectively). Server 22 may then compare the device objects 16 and properties stored on HMI 12 with the ones selected in browser 69 to determine which device objects 16 and properties should be altered. Additionally, if device objects 16 and properties are new additions, the server may identify them as such and locate them accordingly based on defined rules or relationships. In either case, server 22 identifies the revisions or additions to screen instructions 202 via the comparison step.

After identifying the changes, server 22 may then call access module 88 to update screen instructions 202 on HMI 12 (STEPS 11 and 12, reference numerals 204 and 206, respectively). In other words, the server can access memory 68 via java script 168 to obtain the altered or new properties stored in memory 68. The result is that a new set of screen instructions 208, having altered or new device objects and or properties, is stored on HMI 12 (STEP 13, reference numeral 206). Specifically, FIG. 4B illustrates that device objects labeled B and C having reference numeral 1, 2, and 3 in screen 202 have been changed to reference numerals 4, 5, and 6 in screen 208. The reference numerals are representative of any number of properties of any device objects conditioned for the HMI 12. Once the screen instructions 208 have been updated, the HMI 12 may display the device object 16 in a number of useful formats (STEP 14, reference numeral 210). Finally, the server may serve screen instructions 208 to configuration computer 28 (STEP 15, reference numeral 212). The updated screen instructions may then be displayed on a configuration computer in any number of formats (STEP 16, reference numeral 214). For example, screen instructions 208 may be displayed in a tabular form 106 via browser 69. Likewise, screen instructions 208 may be displayed in a development screen form 92 or any other useful format. In sum, FIGS. 3A, 3B, 4A and 4B illustrate a dynamic configuration and reconfiguration of control monitoring device or HMI 12 by altering the device objects 16 using a browser 69 and spreadsheet application 116 combinations.

As discussed, the device objects 16 available to configure the HMI 12 and/or related embedded code are accessed by a configuration computer 28 via a web browser 69. Accordingly, concerns relating to revision and capability differences between the related software components (e.g., operating system, device elements, drivers, etc.) of the HMI 12 and configuration computer 28 are minimal. Functional aspects of the configuration are not necessarily transferred between network interface 36. As discussed above, in accordance with embodiments of the present techniques, configuration of the HMI 12 is achieved through queries submitted via the browser 96. Indeed, the configuration computer 28 and the HMI 12 do not even need to have, and typically will not have the same operating system. It should be noted, that configuration may be provided directly on the HMI through the same techniques and architecture described herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for configuring a control or monitoring device, comprising:
   receiving a user web page from the device on a configuration computer;
   receiving a user selection of data in the web page on the configuration computer;
   receiving properties of objects enumerated in the device based upon the selection; and
   copying the selected data from the web page to a temporary memory space on the configuration computer, selected data corresponding to separate properties of the objects being separated by delimiters in the copied data.

2. The method of claim 1, further comprising pasting the copied data from the temporary memory space into a spreadsheet application running on the configuration computer.

3. The method of claim 2, comprising parsing the copied data by reference to the delimiters to paste data representative of separate properties of the delimited objects into separate cells of the spreadsheet application.

4. The method of claim 3, comprising altering the pasted data in the spreadsheet application.

5. The method of claim 4, comprising copying the altered data from the spreadsheet application to the temporary memory space, data from separate cells being separated by delimiters.

6. The method of claim 5, comprising pasting the altered data from the temporary memory space to the web page, data separated by delimiters being pasted to separate containers in the web page.

7. The method of claim 6, comprising altering properties of the enumerated objects based upon the altered data pasted to the web page.

8. The method of claim 1, wherein the data is arranged in rows and columns in the web page, and wherein each row corresponds to an object in the device, and each cell in each row corresponds to enumerable properties of the respective object.

9. A method for configuring a control or monitoring device, comprising:
  serving a user web page from the device to a configuration computer; and
  serving code from the device to the configuration computer, the code causing a user selection of objects from the web page to be enumerated on the configuration computer to permit delimiting of separate properties of the selected objects.

10. The method of claim 9, wherein the code is script code executable on the configuration computer.

11. The method of claim 9, wherein the code is a link to script code executable on the device.

12. The method of claim 9, wherein the code causes enumeration of the objects upon a user-initiated data copy command.

13. The method of claim 12, wherein the code inserts delimiters between enumerated properties.

14. A system for configuring a control or monitoring device, comprising:
  the monitoring device including a memory configured to store objects having separate properties;
  a server coupled to the monitoring device for serving the objects and properties in web page format;
  a configuration computer for displaying the web page; and
  code located on the monitoring device, server, and/or configuration computer, the code causing the monitoring device to enumerate properties of objects on the device and enabling a user-initiated data copy command to insert delimiters between the enumerated properties for storing in a temporary memory space on the configuration computer.

15. The system of claim 14, further comprising a spreadsheet application on the configuration computer configured to receive the stored enumerated properties from the temporary memory space.

16. The system of claim 15, wherein the spreadsheet application is configured to parse the enumerated objects and properties by reference to the delimiters to paste data representative of separate properties of the delimited objects into separate cells of the spreadsheet application.

17. The system of claim 16, wherein the spreadsheet application is configured to alter the copied data and copy the altered data from the spreadsheet application to the temporary memory space, data from separate cells being separated by delimiters.

18. The system of claim 17, wherein the code is configured to paste the altered data from the temporary memory space to the web page, data separated by delimiters being pasted to separate containers in the web page.

19. The system of claim 18, wherein the code is configured to alter properties of the enumerated objects based upon the altered data pasted to the web page.

20. The system of claim 14, wherein the objects and properties are arranged in rows and columns in the web page, and wherein each row corresponds to an object in the monitoring code, and each cell in each row corresponds to enumerable properties of the respective object.

21. The system of claim 14, wherein the code is script code executable on the configuration computer.

22. The system of claim 14, wherein the code is a link to script code executable on the device.

* * * * *